(12) United States Patent
Czarnecki et al.

(10) Patent No.: US 10,948,093 B2
(45) Date of Patent: Mar. 16, 2021

(54) CHECK VALVES

(71) Applicant: Hamilton Sundstrand Corporation, Charlotte, NC (US)

(72) Inventors: Pawel Czarnecki, Świdnica (PL); Lukasz Bogdanowicz, Wroclaw (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/434,216

(22) Filed: Jun. 7, 2019

(65) Prior Publication Data
US 2020/0011440 A1 Jan. 9, 2020

(30) Foreign Application Priority Data

Jul. 7, 2018 (EP) ..................................... 18461575

(51) Int. Cl.
*F16K 15/03* (2006.01)
(52) U.S. Cl.
CPC ....... *F16K 15/035* (2013.01); *Y10T 137/7898* (2015.04); *Y10T 137/7902* (2015.04)
(58) Field of Classification Search
CPC ............. F16K 15/035; Y10T 137/7898; Y10T 137/7902; Y10T 137/7885; Y10T 137/7886; Y10T 137/7882
See application file for complete search history.

(56) References Cited

U.S. PATENT DOCUMENTS

| | | | |
|---|---|---|---|
| 3,148,696 A * | 9/1964 | Hoke | F16L 41/045 137/318 |
| 4,351,358 A * | 9/1982 | Ogle, Jr. | F16K 15/035 137/512.1 |
| 4,465,102 A | 8/1984 | Rupp | |
| 6,035,896 A * | 3/2000 | Liardet | A61M 16/208 137/512.4 |
| 9,909,375 B2 * | 3/2018 | Church | E21B 21/10 |
| 2006/0016479 A1 * | 1/2006 | Gonzales | E03C 1/104 137/283 |
| 2017/0167618 A1 | 6/2017 | Czarnecki | |

FOREIGN PATENT DOCUMENTS

WO 2007064270 A1 6/2007

OTHER PUBLICATIONS

Extended European Search Report for International Application No. 18461575.5 dated Jan. 4, 2019, 8 pages.

* cited by examiner

*Primary Examiner* — Jessica Cahill
*Assistant Examiner* — Patrick C Williams
(74) *Attorney, Agent, or Firm* — Cantor Colburn LLP

(57) ABSTRACT

A check valve comprises a valve housing defining an opening and a plurality of flapper elements each having a proximal end and a distal end. The flapper elements are pivotally mounted to the valve housing at their proximal ends for pivotal movement between a closed position, in which they block the flow of fluid through the opening and an open position in which they permit the flow of fluid through the opening. Each flapper element is generally triangular or trapezoidal in shape such that the flapper elements together create a generally conical or frustoconical surface when the valve is in the closed position. A resilient band extending around a circumference of the conical or frustoconical surface defined by the plurality of flapper elements in the closed position for biasing the flapper elements towards the closed position.

12 Claims, 6 Drawing Sheets

CHECK VALVES

FOREIGN PRIORITY

This application claims priority to European Patent Application No. 18461575.5 filed Jul. 7, 2018, the entire contents of which is incorporated herein by reference.

TECHNICAL FIELD

The present disclosure relates to a check valve.

BACKGROUND

It is known to use check valves to allow fluid flow in one direction, and to prevent flow in the opposite direction. Check valves are widely used in a wide variety of applications, for example in air conditioning systems, for example in aircraft air conditioning systems. Many types of check valves are known. Some check valves include hinged flappers that open in the direction of fluid flow. In such valves, when a fluid pressure exceeds a predetermined valve "cracking pressure", the flappers of the valve open. Likewise, if significant pressure drops in the upstream fluid are experienced (such that there is a negative pressure differential across the valve), the flapper elements close, preventing flow reversal.

Some such check valves include a pair of flapper elements and frequently employ stop pins or bumpers which restrict movement of the flapper past a predetermined maximum opening angle.

Other such check valves, such as illustrated in US2017/0167618 A1 (whose disclosure is incorporated by reference herein), comprise a plurality of generally triangular or trapezoidal flapper elements pivotally mounted to a housing for pivotal movement between an open position in which they permit the flow of fluid through the opening and a closed position, in which they block the flow of fluid through the opening. In the closed position, the flapper elements create a generally conical or frustoconical shape. As disclosed in US2017/0167618 A1, the flapper elements may be biased towards the closed position by torsion springs acting on the flapper elements.

SUMMARY

The present disclosure provides a check valve which comprises a valve housing defining an opening and a plurality of flapper elements each having a proximal end and a distal end. The flapper elements are pivotally mounted to the valve housing at their proximal ends for pivotal movement between a closed position, in which they block the flow of fluid through the opening and an open position in which they permit the flow of fluid through the opening. Each flapper element is generally triangular or trapezoidal in shape (i.e. a sector or an annular sector) such that the flapper elements together create a generally conical or frustoconical surface when the valve is in the closed position. A resilient band extending around a circumference of the conical or frustoconical surface defined by the plurality of flapper elements in the closed position for biasing the flapper elements towards the closed position.

In embodiments of the disclosure, one or more of the flapper elements may comprises a locator for locating the resilient band.

In certain embodiments, each flapper element may comprises a locator.

The locators may together form a ring around the check valve when the check valve is in the closed position.

In embodiments the ring may be circumferentially continuous.

The locator may be provided on an outer surface of the flapper element.

The locator may comprise a projection on the outer surface of the flapper element.

The projection may be a rib which extends from one side edge of the flapper element to an opposed side edge of the flapper element.

The resilient band may project above the locator in the open position of the valve.

The locator may comprise a groove for receiving the resilient band.

The groove may face the proximal end of the flapper element.

The locator may be located in the middle 50%, for example the middle 20% of the length of the flapper elements.

The resilient band may have a circular cross section.

The resilient band is made from an elastomeric material.

The disclosure also provides a duct comprising a check valve in accordance with the disclosure mounted therein, wherein, optionally, in the open position of the check valve the resilient band contacts an inner wall of the duct.

BRIEF DESCRIPTION OF THE DRAWINGS

Some exemplary embodiments and features of the present disclosure will now be described by way of example only, and with reference to the following drawings in which.

DETAILED DESCRIPTION

Figure 1:
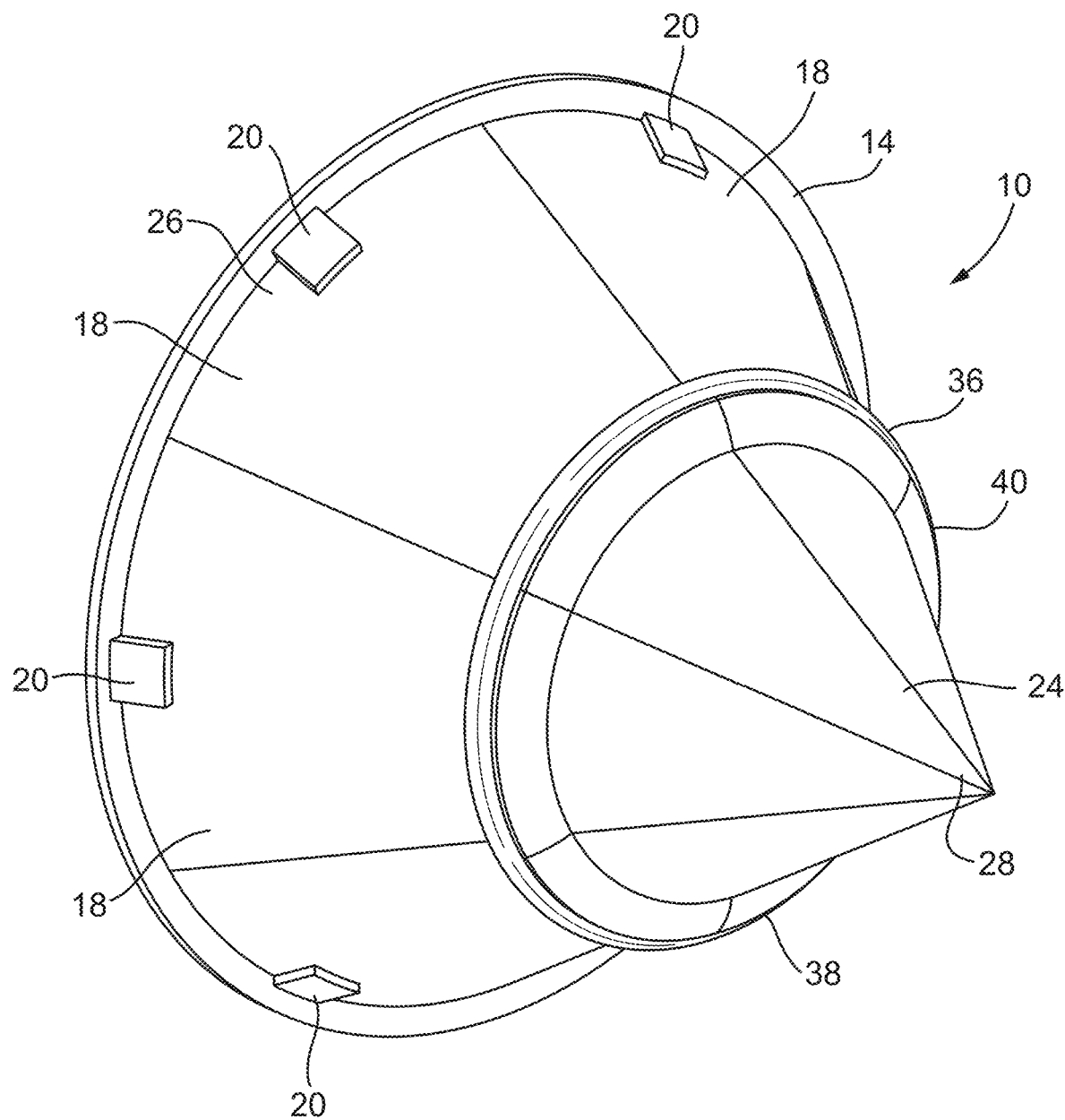
FIG. 1 shows a perspective view of a first embodiment of check valve in accordance with this disclosure, in a fully closed position.

With reference to FIGS. 1 to 4, a flapper check valve 10 is illustrated. Check valve 10 is configured to be mounted in, for example, a duct 12 (shown in FIG. 4) in order to prevent reverse flow of a fluid through the duct 12. As shown, the check valve 10 comprises a generally annular valve housing 14, defining an opening 16 therethrough. The valve 10 further comprises a plurality of (in this embodiment six) adjacent flapper elements 18 which are pivotally mounted to the valve housing 14 by hinges 20. The hinges 20 may be of any suitable type, for example pin hinges. The flapper elements 18 are configured to move between a closed position (shown in FIGS. 1 and 2) and an open position (shown in FIGS. 3 and 4), respectively preventing or permitting flow through the opening 16.

As shown in FIG. 1, in the closed position, the flapper elements 18 of the valve 10 together define a generally conical surface 21.

Each flapper element 18 includes an inner surface 22, an outer surface 24, a proximal end 26, a distal end 28 and opposed side edges 30, 32 extending between the proximal end 26 and the distal end 28. The flapper elements 18 are generally triangular in shape, tapering from the proximal end 26 to an apex at the distal end 28. The hinges 20 are provided at the proximal ends 26 of the flapper elements 18.

Figure 2:
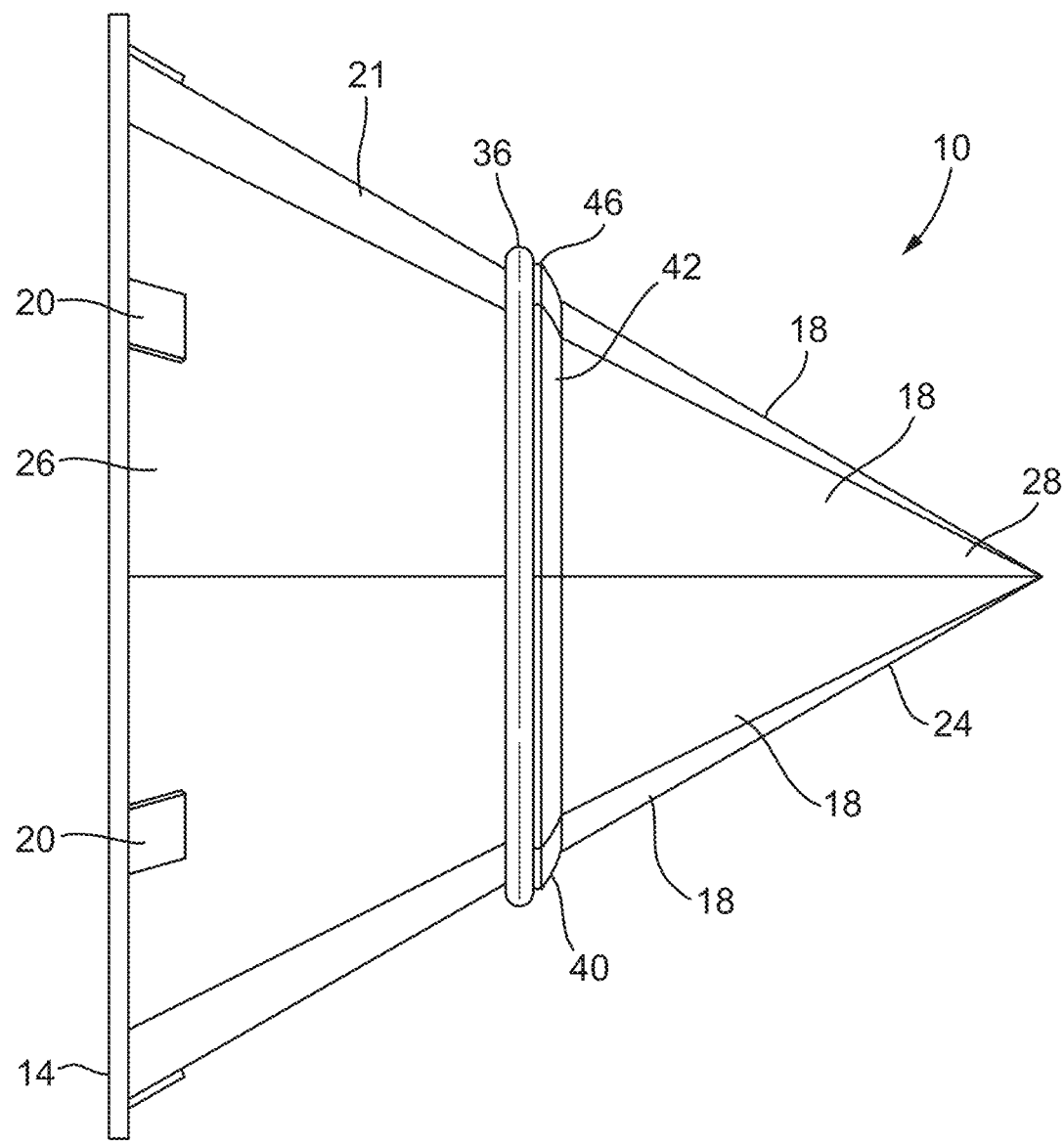
FIG. 2 shows a side view of the check valve of FIG. 1.
Figure 3:
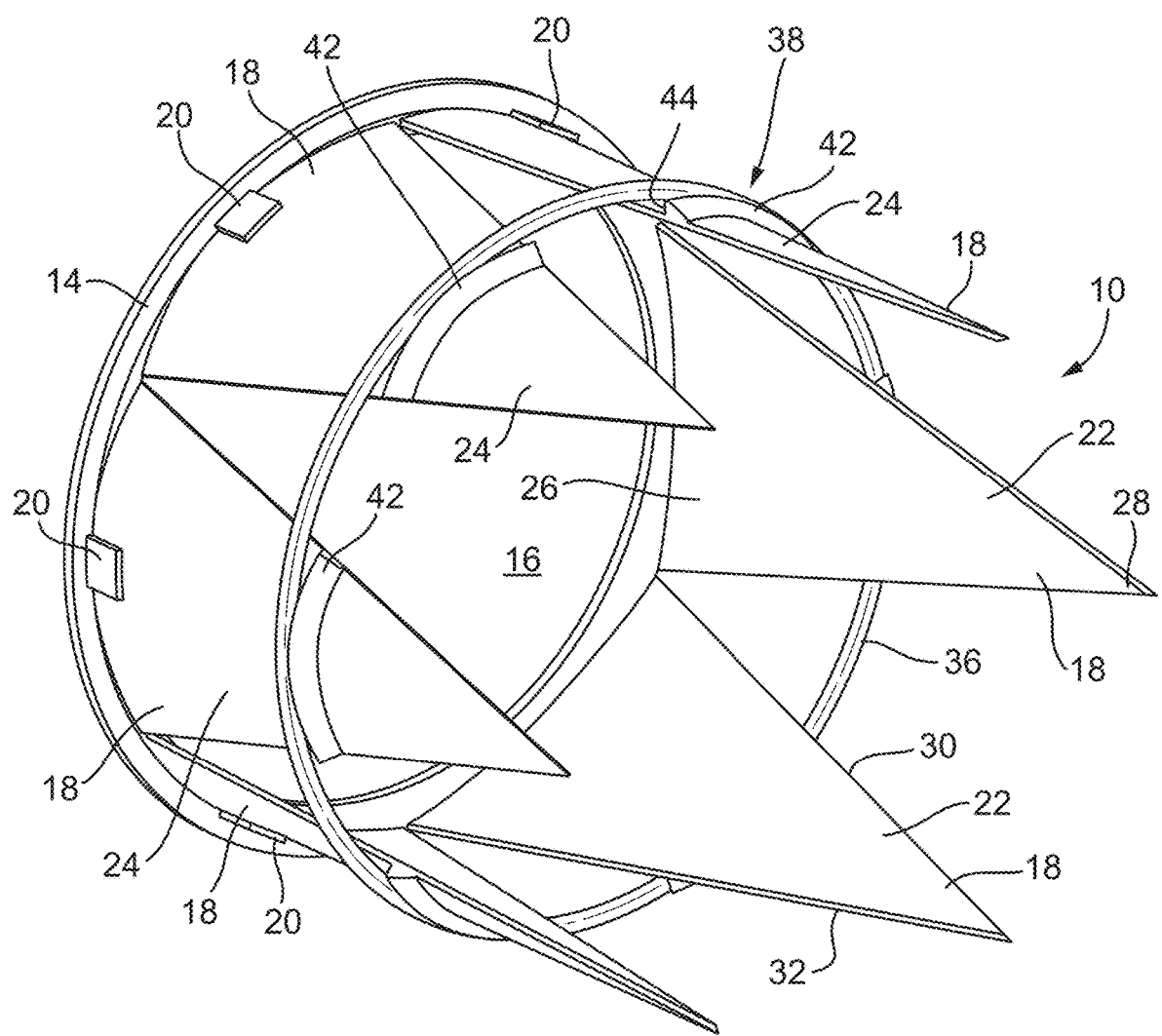
FIG. 3 shows a perspective view of the check valve of FIG. 1 in a fully open position.

It will be seen from FIGS. 1 and 2 that in the closed position of the valve 10, the flapper elements 18 engage one another along their side edges 30, 32 so as to prevent flow passing between the flapper elements 18. Also, the proximal ends 26 of the flapper elements 18 will engage the annular valve housing 14 to prevent flow from passing between the flapper elements 18 and the housing 14. Resilient sealing elements (not shown) may be provided along one or more of the proximal end 26 and side edges 30, 32 of the flapper elements 18 to improve the seal. Also or alternatively, the flapper elements 18 may overlap one another circumferentially as illustrated in FIGS. 4A to 5B of US 2017/0167618 A1.

As described thus far, the valve 10 is generally similar to that illustrated in FIGS. 4A to 5B of US 2017/0167618 A1.

The valve 10 further comprises a biasing element 36 for biasing the flapper elements 18 towards the closed position of the valve 10. The biasing element 36 comprises a resilient band extending around a circumference of the conical shape defined by the plurality of flapper elements 18 in the closed position of the valve 10. In this embodiment, the biasing element 36 is formed as an O-ring, with a circular cross section, although other cross sectional shapes, for example rectangular, are possible within the scope of the disclosure.

The resilient band 36 may be made from any suitable material, for example an elastomeric material, for example rubber.

One or more of the flapper elements 18 each comprise a locator 38 for locating the resilient band 36. In the disclosed embodiment, the locator 38 is provided on the outer surface 24 of the flapper element 18.

In this embodiment, each flapper element 18 comprises a locator 38. In other embodiments, however, only some flapper elements 18 (for example alternate flapper elements 18) may be provided with a locator.

In this embodiment, the locators 38 together form a ring 40 on the external conical surface 21 of the check valve 10 when the valve 10 is in the closed position.

In this embodiment, the ring 40 is circumferentially continuous. However in other embodiments, for example where only selected flapper elements 18 have locators, the ring 40 may be circumferentially discontinuous In the illustrated embodiment, the locator 38 comprises a projection 42 on the outer surface 24 of the flapper element 18. In particular, the projection 42 is formed as a rib which extends from one side edge 30 of the flapper element 18 to the opposed side edge 32 of the flapper element 18. The rib 42 may be continuous as shown, or may be interrupted along its length.

The rib 42 in this embodiment comprises a groove 44 on its side facing the proximal end 26 of the flapper element 18 to improve retention of the resilient band 36. The groove 44 may have a complementary shape to that of the resilient band 36. Thus, as illustrated, the groove 44 may have an arcuate shape. In other embodiments, the groove 44 may be provided on an alternative face, for example a radially outwardly facing face of the rib 42.

The locator 38 may be positioned at any suitable location between the proximal and distal ends 26, 28 of the flapper element 18. Typically, however, the locator 38 may be positioned in a middle section of the flapper element 18, i.e. in the middle 50% of the flapper element length, for example in the middle 20% of the flapper element length.

The dimensions and elasticity of the resilient band 36 may be chosen to suit the particular application. The resilient band 36 may be dimensioned such as to be stretched when the valve 10 is in the closed position so as to improve its retention on the valve 10. The elasticity may be chosen so that the resilient band 36 does not prevent opening of the flapper elements 18 at the desired cracking pressure of the valve 10.

Apart from providing a biasing force for closing the flappers 18, in the illustrated embodiment, the resilient band 36 also advantageously provides a bumper function.

Figure 4:
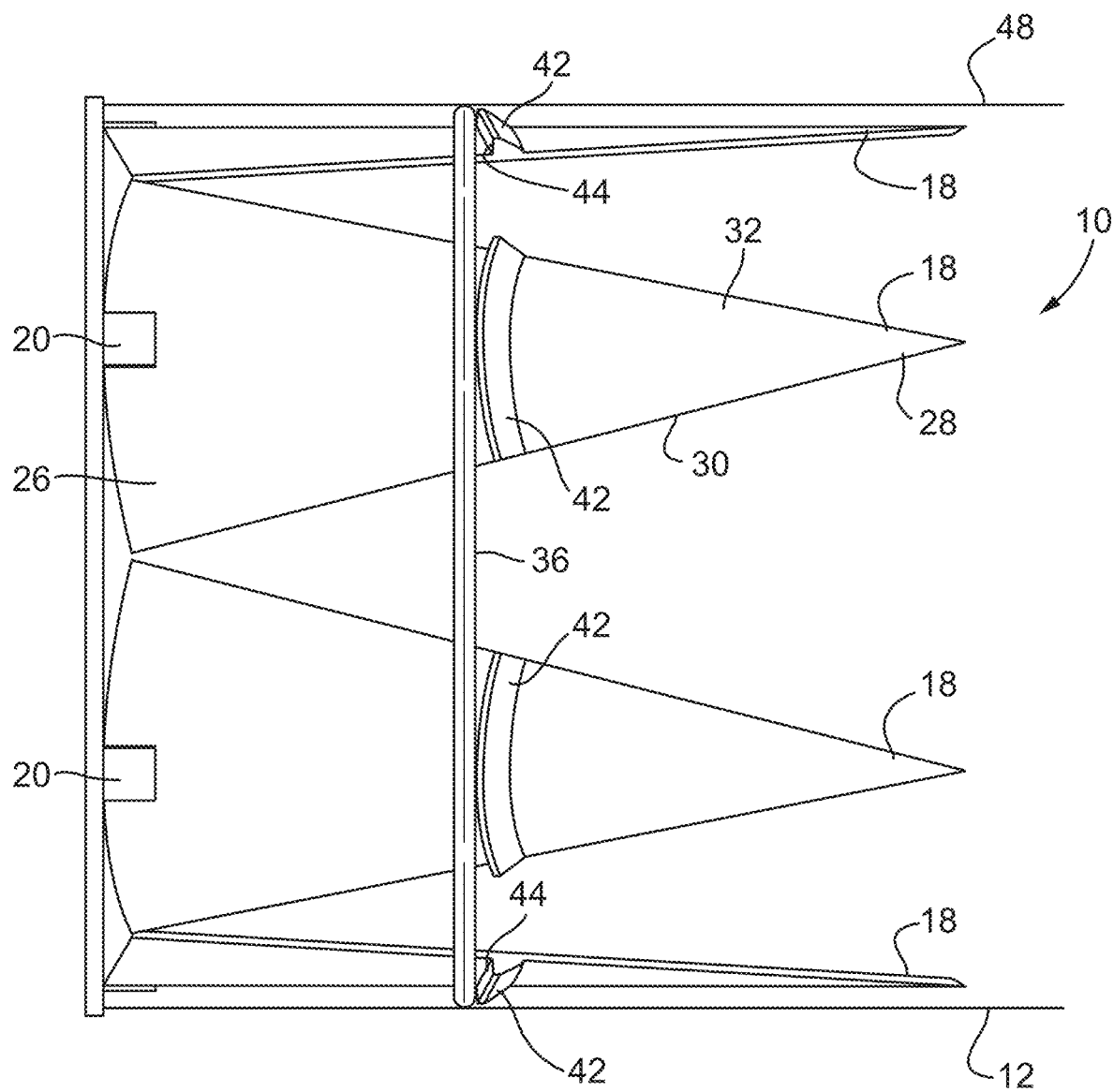
FIG. 4 shows a side view of the check valve of FIG. 3.

As can be seen from FIGS. 2 and 4 for example, the resilient band 36 projects above the upper edge 46 of the ribs 42 when the valve 10 is in its open position. This means that, as shown in FIG. 4, the resilient band 36 will impact the inner wall 48 of the duct 12 in which the valve is mounted. This will allow the impact of the flapper elements 18 on the duct inner wall 48 to be damped, thereby potentially avoiding the need for separate bumpers to be provided on the flapper elements 18.

Figure 5:
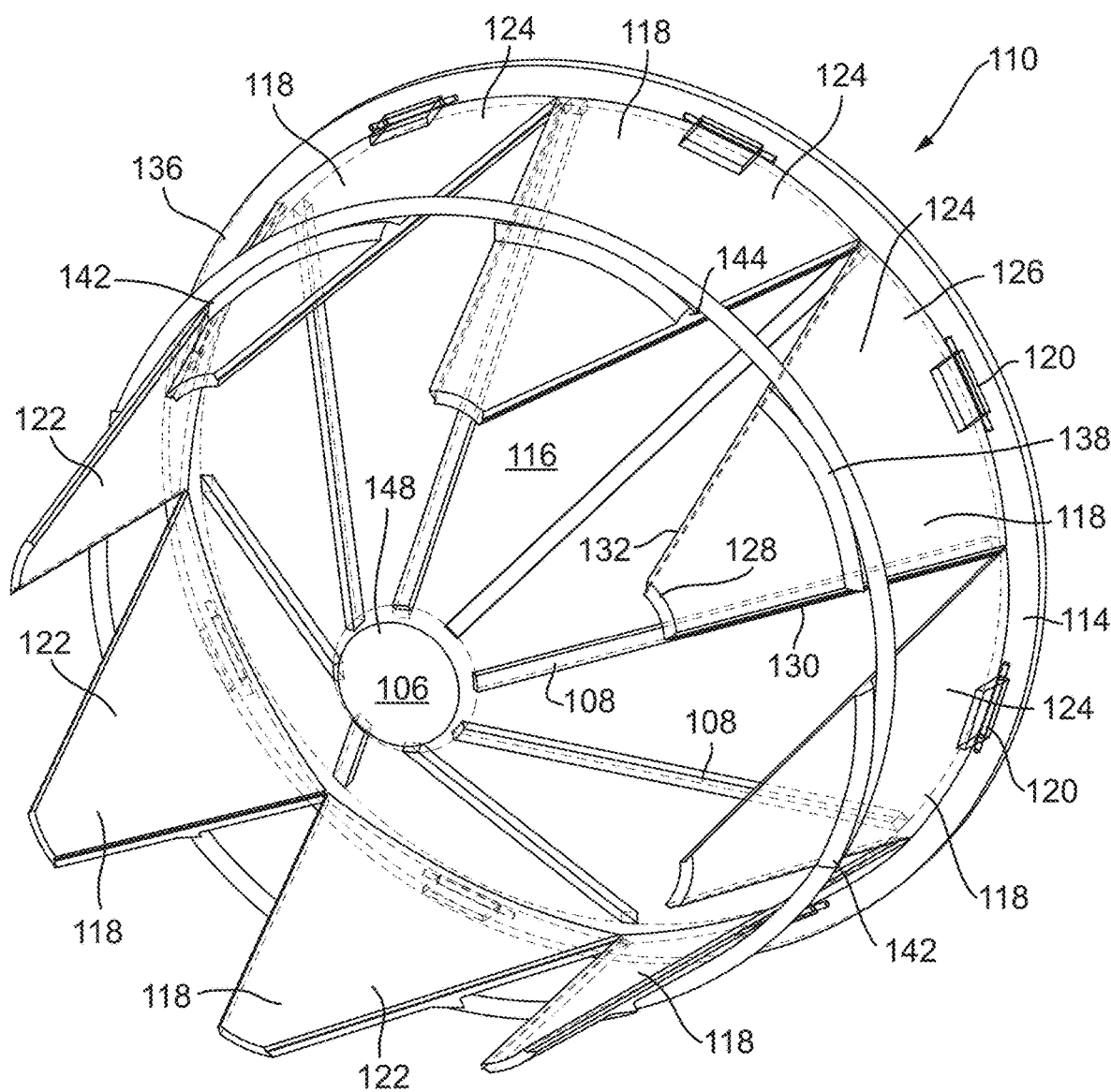
FIG. 5 shows a perspective view of a second embodiment of check valve in accordance with this disclosure, in a fully open position.
Figure 6:
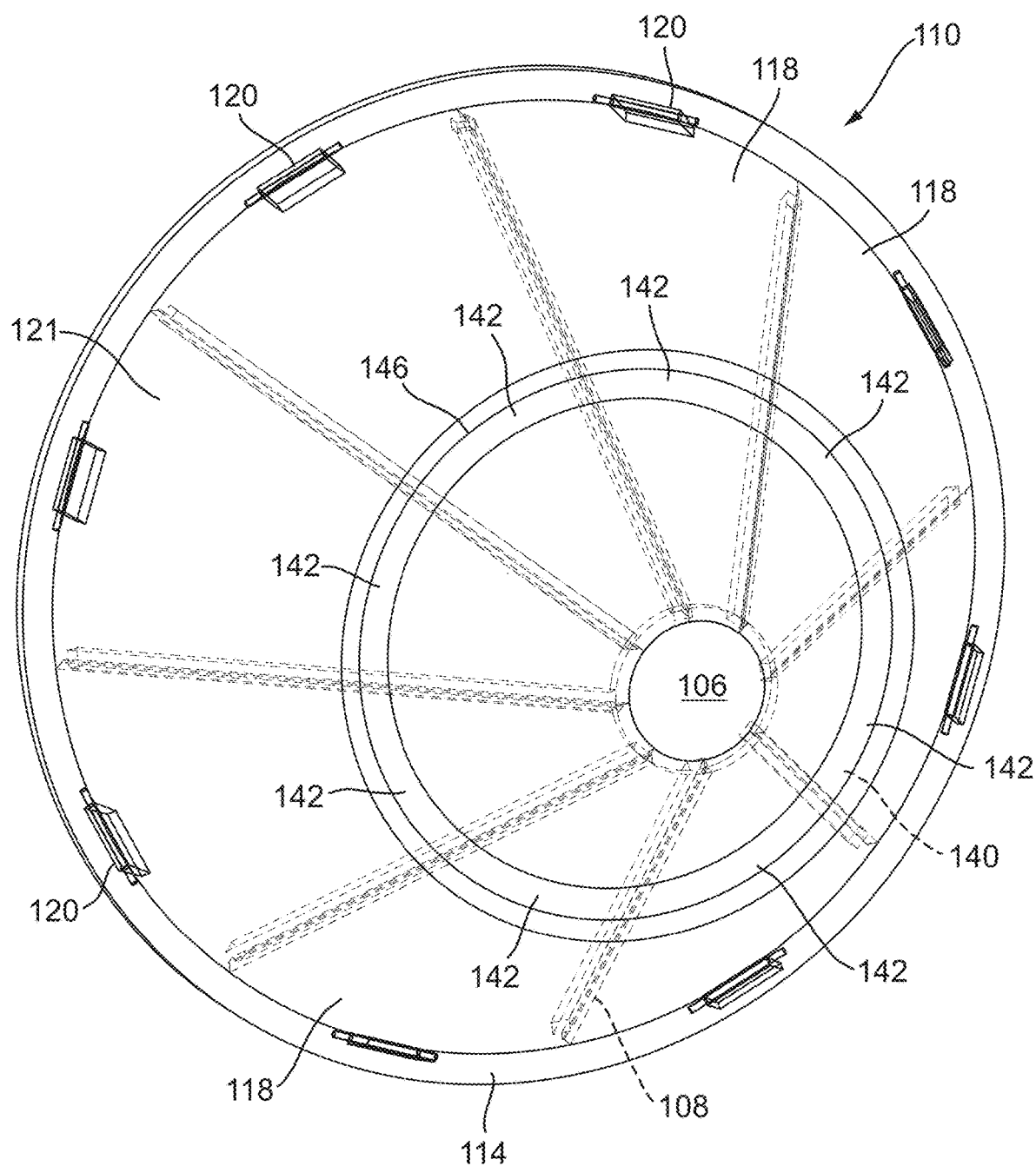
FIG. 6 shows the check valve of FIG. 5 in its closed position.

In the embodiment described above, the flapper elements 18 are generally triangular in shape. However, the flapper elements 18 may, in an alternative embodiment, be generally trapezoidal in shape. Such an embodiment is illustrated in FIGS. 5 and 6.

In this embodiment, therefore, each flapper element 118 is generally trapezoidal in shape. Thus, in the closed position of the valve 110, the flapper elements 118 create a generally frustoconical surface 121.

As in the earlier embodiment, each flapper element 118 includes an inner surface 122, an outer surface 124, a proximal end 126, a distal end 128 and opposed side edges 130, 132 extending between the proximal end 130 and the distal end 132. Hinges 120 are provided at the proximal ends 126 of the flapper elements 118 for pivotally connecting each flapper element 118 to the annular housing 114 of the valve 110.

The valve 110 further comprises a plug element 106, mounted axially forward of the valve housing 114. The plug element 106 is mounted to the valve housing 114 by means of a plurality of circumferentially spaced supports 108. In the embodiment shown, the plug element 106 is in the form of a disc. However, it will be appreciated that a plug element 106 of any suitable shape may be used. The plug element 106 comprises a circumferential edge portion 148 which is configured to engage the distal ends 128 of the flapper elements 118 when the valve 110 is in the closed position, to effect a seal therebetween. The flapper elements 118 may either seal against one another and/or against the supports 108 in the closed condition of the valve 110. The side edges 130, 132 of adjacent flapper elements 118 may overlap circumferentially.

As in the earlier embodiment, the valve 110 also comprises a biasing element 136 in the form of a resilient band for biasing the flapper elements 118 towards the closed position of the valve 110. The resilient band 136 extends around a circumference of the frustoconical surface defined by the plurality of flapper elements 118 in the closed position of the valve 110. The resilient band 136 may be constructed and configured similarly to that of the resilient band 36 of the first embodiment and need not therefore be described in further detail here.

Also, one or more of the flapper elements 118 (in this case each flapper element 118) comprises a locator 138 for locating the resilient band 136. The possible locations, shapes and configurations of the locators 138 in this embodiment may also be similar to those of the first embodiment and need not therefore need further detailed description here.

Thus in this embodiment also, the resilient band 136 may project above an upper edge 146 of the ribs 142 when the valve 110 is in its open position such that the resilient band 136 may impact the inner wall of a duct in which the valve 110 is mounted.

In operation of either embodiment described above, when the cracking pressure of the valve 10, 110 is exceeded, the flapper elements 18, 118 will move from the fully closed position (shown in FIGS. 1, 2 and 6) to the fully open position (shown in FIGS. 3 to 5) against the action of the respective resilient bands 36, 136. When the flow pressure is reduced below a predetermined value or where the flow through the valve 10, 110 reverses, the resilient band 36, 136 will pull the flapper elements 18, 118 inwardly to close the valve 10, 110.

The use of a common resilient band 36, 136 rather than multiple discrete torsion springs acting on individual flapper elements (as was proposed in US2017/0167618 A1) to bias the flapper elements 18, 118 towards the closed position is potentially advantageous in a number of respects. Firstly, just a single element is required rather than multiple elements, facilitating construction and assembly. Also, it reduces the likelihood of downstream damage caused by elements of broken torsion spring (particularly metallic torsion springs as would typically be used) traveling downstream.

Moreover if, as illustrated, the resilient band 36, 136 forms a bumper, engaging the surrounding inner duct wall 48 in the open position of the valve 10, 110, it may obviate the need for separate bumpers provided adjacent the hinge 20, 120 on each flapper element 18, 118 as was proposed in US2017/0167618 A1. Again this may simplify the manufacture and assembly of the valve 10, 110. Moreover, due to its position, it reduces the torque on the hinge 20, 120, meaning that this may potentially be of a less robust and thus lighter construction. Also, the resilience of the band 36, 136 acts to damp impact forces on the flapper elements 18, 118, potentially increasing the operating life of the valve 10, 110.

It will be understood that the embodiments described above are merely exemplary and that modifications may be made thereto without departing from the scope of the disclosure.

For example while the locator 38, 138 has been illustrated as a projection 42, 142 in other embodiments, depending on the thickness of the flapper elements 18, 118, it may be configured as a groove. Also, while the side edges 30, 32, 130, 132, of the flapper elements 18, 118 are shown as straight, in certain embodiments, they may have a curved configuration within the scope of the disclosure. The terms "generally triangular" and "generally trapezoidal" as used herein should therefore be construed accordingly.

The invention claimed is:

1. A duct comprising a check valve mounted therein and an inner wall, wherein the check valve comprises:
   a valve housing defining an opening;
   a plurality of flapper elements each having a proximal end and a distal end, the flapper elements being pivotally mounted to the valve housing at their proximal ends for pivotal movement between a closed position, in which the flapper elements block the flow of fluid through the opening and an open position in which the flapper elements permit the flow of fluid through the opening, wherein each flapper element is shaped as a sector or an annular sector such that the flapper elements together create a conical or frustoconical surface when the flapper elements are in the closed position;
   a resilient band extending around a circumference of the conical or frustoconical surface defined by the plurality of flapper elements in the closed position for biasing the flapper elements towards the closed position,
   wherein one or more of the flapper elements comprises a locator for locating the resilient band, the resilient band projects radially outward of the locator with the flapper elements in the open position and, with the flapper elements in the open position, the resilient band contacts the inner wall.

2. The duct of claim 1, wherein each flapper element comprises a respective locator for locating the resilient band.

3. The duct of claim 1, wherein the locators together form a ring around the check valve when the flapper elements are in the closed position.

4. The duct of claim 3, wherein the ring is circumferentially continuous.

5. The duct of claim 1, wherein the locator is provided on an outer surface of the flapper element.

6. The duct of claim 1, wherein the locator comprises a projection on an outer surface of the flapper element.

7. The duct of claim 6, wherein the projection is a rib which extends from one side edge of the flapper element to an opposed side edge of the flapper element.

8. The duct of claim 1, wherein the locator comprises a groove for receiving the resilient band.

9. The duct of claim 1, wherein the groove faces a proximal end of the flapper element.

10. The duct of claim 1, wherein the locator is located in a middle 50% of a length of the flapper elements.

11. The duct of claim 1, wherein the resilient band has a circular cross section.

12. The duct of claim 1, wherein the resilient band is made from an elastomeric material.

* * * * *